United States Patent [19]

Watanabe et al.

[11] Patent Number: 5,308,107
[45] Date of Patent: May 3, 1994

[54] STRUCTURE FOR MOUNTING AN AIR BAG IN AN AIR BAG SYSTEM

[75] Inventors: Kazuo Watanabe; Tadahiro Igawa, both of Shiga, Japan

[73] Assignee: Takata Corporation, Tokyo, Japan

[21] Appl. No.: 791,522

[22] Filed: Nov. 14, 1991

[30] Foreign Application Priority Data

Nov. 30, 1990 [JP]  Japan ................................. 2-334586
Nov. 30, 1990 [JP]  Japan ................................. 2-334588

[51] Int. Cl.⁵ ............................................. B60R 21/16
[52] U.S. Cl. ............................ 280/728 A; 411/546; 403/14
[58] Field of Search .............. 280/741, 728, 731, 732, 280/736, 743; 411/160, 546; 403/13, 14

[56] References Cited

U.S. PATENT DOCUMENTS

| 3,907,330 | 9/1975 | Kondo et al. | 280/731 |
|---|---|---|---|
| 3,945,665 | 3/1976 | Tsutsumi et al. | 280/731 |
| 4,148,503 | 4/1979 | Shiratori et al. | 280/731 |
| 4,183,550 | 1/1980 | Sudou | 280/731 |
| 4,419,058 | 12/1983 | Franklin | 403/14 |
| 4,747,737 | 5/1988 | Roffelsen | 411/546 |
| 4,830,401 | 5/1989 | Honda | 280/736 |
| 4,887,842 | 12/1989 | Sato | 280/730 |
| 4,988,119 | 1/1991 | Hartmeyer | 280/743 |
| 5,064,218 | 11/1991 | Hartmeyer | 280/731 |

FOREIGN PATENT DOCUMENTS

| 0364267 | 4/1990 | European Pat. Off. . |
|---|---|---|
| 0469734 | 2/1992 | European Pat. Off. . |
| 2170337 | 9/1973 | France . |
| 90/15713 | 12/1990 | PCT Int'l Appl. . |
| 1396635 | 9/1973 | United Kingdom . |
| 1366983 | 9/1974 | United Kingdom . |
| 2214139A | 8/1989 | United Kingdom . |

*Primary Examiner*—Karin Tyson
*Attorney, Agent, or Firm*—Kanesaka & Takeuchi

[57] ABSTRACT

A structure for mounting an air bag in an air bag system, comprises a retainer having an inflator mounting opening, an air bag having an inflator receiving opening aligned with the inflator mounting opening, a press ring cooperating with the retainer to sandwich the peripheral edge of the inflator receiving opening of the air bag, and means for securing the press ring to the retainer. The structure further includes a sheet made of synthetic resin and attached to the peripheral edge of the inflator receiving opening of the air bag.

4 Claims, 11 Drawing Sheets

STRUCTURE FOR MOUNTING AN AIR BAG IN AN AIR BAG SYSTEM

FIELD OF THE INVENTION

The present invention relates to a structure for mounting an air bag adapted to be inflated so as to protect a vehicle occupant in the event of a collision.

RELATED ART

An air bag system is mounted to a fixed component of a vehicle in front of a seat. In emergency situations such as a crash, a gas generator, which is secured to a steering wheel or a console, is actuated to generate an inflatable gas at a given pressure to instantaneously inflate (or deploy) an air bag to protect a vehicle occupant.

Figure 9:
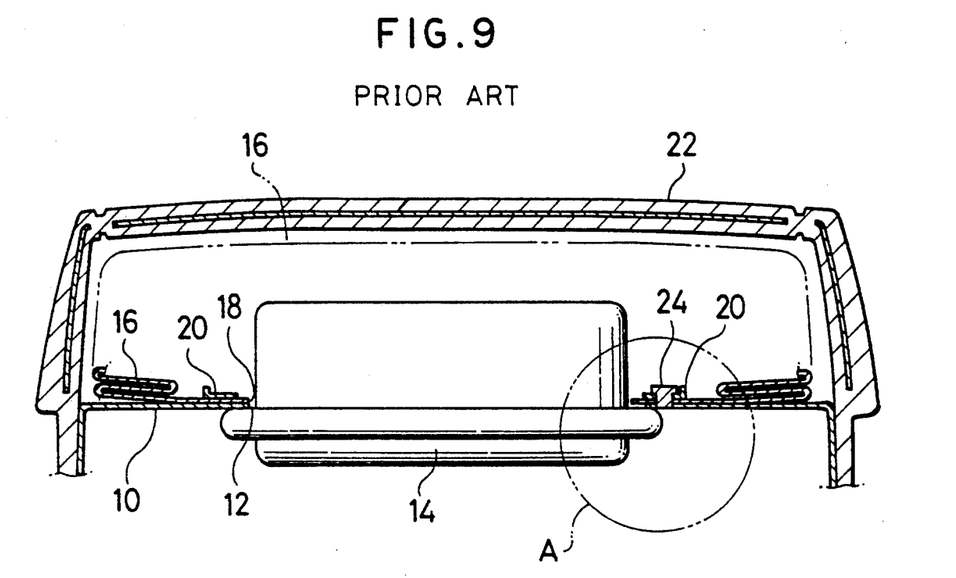
FIG. 9 is a vertical sectional view of a conventional air bag system.
Figure 10:
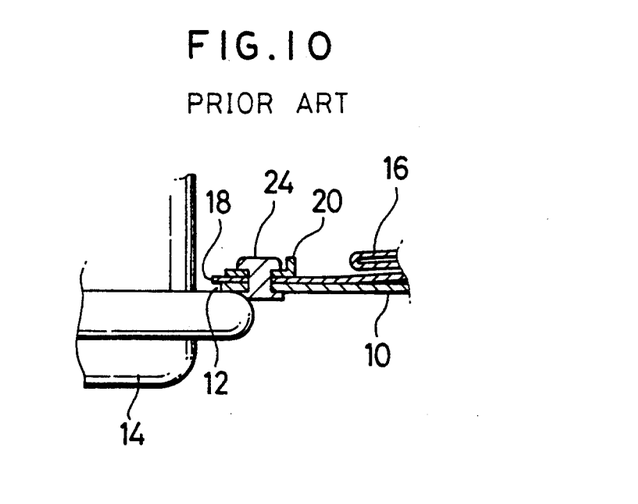
FIG. 10 is an enlarged sectional view showing the principal part of the air bag system shown in FIG. 9.

FIG. 9 is a sectional view showing one example of a conventional air bag system. FIG. 10 is a sectional view, on an enlarged scale, of a portion of the air bag system as indicated at A in FIG. 9.

In these figures, the reference numeral 10 designates an air bag mount, commonly referred to as a retainer. The retainer 10 has a central or inflator mounting opening 12 to receive an inflator 14.

An air bag 16 has an inflator receiving opening 18 through which the front end of the inflator 14 extends. The opening 18 of the air bag is aligned with the central opening 12 of the retainer 10. A press ring 20 is placed on the peripheral edge of the opening 18 of the air bag to sandwich the peripheral edge of the opening 18 of the air bag between the press ring 20 and the peripheral edge of the opening 12 so as to secure the air bag 16 to the retainer 10.

The air bag 16 is stored in a folded condition and is covered by a modular cover 22. The modular cover 22 is torn when the inflator 14 is actuated to generate an inflatable gas to deploy the air bag 16.

Conventionally, the press ring 20 is secured to the retainer 10 by rivets (particularly, blind rivets) 24 or screws (not shown).

Alternatively, stud bolts may be fixed to the press ring 20 and extend downwardly through corresponding bolt apertures of the retainer 10. The stud bolts are used to mount the inflator to the retainer.

Such a conventional structure requires a plurality of rivets (for example, eight rivets) to firmly secure the air bag to the retainer. This increases the time required to secure the air bag to the retainer by rivets or screws and reduces the production rate. This also results in an increase in the cost of rivets or screws.

OBJECT AND SUMMARY OF THE INVENTION

It is an object of the present invention to provide a structure which reduces the number of rivets or screws required to secure an air bag to a retainer, increases the production rate, and decreases the production cost.

According to a first feature of the present invention, there is provided a structure for mounting an air bag in an air bag system, which comprises a retainer having an inflator mounting opening, an air bag having an inflator receiving opening aligned with the inflator mounting opening, a press ring cooperating with the retainer to sandwich the peripheral edge of the inflator receiving opening of the air bag, and means for securing the press ring to the retainer, wherein one of the press ring and the retainer includes projections, and the other includes engagement portions to receive the projections, and wherein the air bag has at its peripheral edge apertures through which the projections extend to engage with the engagement portions.

According to a second feature of the present invention, there is provided a structure for mounting an air bag in an air bag system, which comprises a retainer having an inflator mounting opening, an air bag having an inflator receiving opening aligned with the inflator mounting opening, a press ring cooperating with the retainer to sandwich the peripheral edge of the inflator receiving opening of the air bag, and means for securing the press ring to the retainer, wherein the press ring, the air bag, and the retainer include apertures at a portion where the press ring, the peripheral edge of the inflator receiving opening of the air bag, and the retainer are overlapped with one another, and pins extend into the apertures.

The pins may be split pins.

In the structure according to the first and second features of the present invention, the projections extend from either one of the press ring or the retainer and fit into the engagement portions of the other. These projections resist force which may, otherwise, cause release of the peripheral edge of the opening of the air bag from the press ring and the retainer when the air bag is inflated. The provision of a number of such projections does prevent release of the peripheral edge of the inflator receiving opening of the air bag when the air bag is inflated.

These projections are simply inserted into the engagement portions of the other member (the press ring or the retainer). Engagement of the projections and the engagement portions can thus be effected only by positioning and pressing the press ring against the retainer.

After the projections have been engaged with the engagement portions, a few number of rivets or screws may be used, if necessary, to secure the press ring to the retainer.

Rivets or screws may not be necessary when the projections are tightly fitted into the engagement portions to firmly secure the press ring to the retainer.

Also, in the structure of the present invention, the pins, which extend through the press ring, the peripheral edge of the opening of the air bag, and the retainer, resist force which may, otherwise, cause release of the peripheral edge of the opening of the air bag from the press ring and the retainer when the air bag is inflated. The provision of a number of such pins does prevent release of the peripheral edge of the inflator receiving opening of the air bag when the air bag is inflated.

These pins are simply inserted into the apertures of the press ring, the air bag and the retainer. This enables ready assembly of the air bag system.

After the pins have been inserted, a few number of rivets or screws may be used, if necessary, to secure the press ring to the retainer.

Rivets or screws may not be used when the pins are tightly fitted into the apertures or when split pins are used.

As previously stated, the structures according to the first and second features of the present invention require a fewer number of rivets or screws to secure the air bag to the retainer. This results in an increase in the production rate and in a decrease in the cost of rivet or screws. The air bag is not only sandwiched between the press ring and the retainer, but also engaged with the projections, the pins or the split pins in the press ring and/or the retainer. This assures fastening of the air bag to the retainer.

According to a third feature of the present invention, there is provided a structure for mounting an air bag in an air bag system, which comprises a retainer having an inflator mounting opening, an air bag having an inflator receiving opening aligned with the inflator mounting opening, a press ring cooperating with the retainer to sandwich the peripheral edge of the inflator receiving opening of the air bag, means for securing the press ring to the retainer, and a sheet made of synthetic resin and attached to the peripheral edge of the inflator receiving opening of the air bag.

In the structure according to the third feature of the present invention, the sheet made of synthetic resin cooperates with the pins, bolts or screws to firmly secure the peripheral edge of the inflator receiving opening of the air bag. In other words, force which may cause release of the peripheral edge of the inflator receiving opening of the air bag from the press ring and the retainer when the air bag is inflated can be dispersed through the sheet. Thus, this arrangement prevents release of the peripheral edge of the inflator receiving opening of the air bag and reinforces the peripheral edge of the inflator receiving opening of the air bag.

According to a fourth feature of the present invention, there is provided a structure for mounting an air bag in an air bag system wherein the sheet has projections to engage with the engagement portions of the press ring and/or the retainer.

According to a fifth feature of the present invention, there is provided a structure for mounting an air bag in an air bag system wherein one of the press ring and the retainer includes projections, and the other includes engagement portions to receive the projections, and wherein the peripheral edge of the inflator receiving opening of the air bag and the sheet include apertures through which the projections extend to engage with the engagement portions.

In the structure according to the fourth feature of the present invention, the sheet includes projections. Also, in the structure according to the fifth embodiment of the present invention, the projections extend from either one of the press ring or the retainer through the apertures of the annular sheet into the engagement portions of the other member. These projections resist force which may, otherwise, cause release of the peripheral edge of the opening of the air bag from the press ring and the retainer when the air bag is inflated. The provision of a number of such projections does prevent release of the peripheral edge of the inflator receiving opening of the air bag when the air bag is inflated.

These projections are simply inserted into the engagement portions of the other member, i.e., the press ring or the retainer. Engagement of the projections and the engagement portions can thus be effected only by positioning and pressing the press ring against the retainer.

After the projections have been engaged with the engagement portions, a few number of rivets or screws may be used, if necessary, to secure the press ring to the retainer.

Rivets or screws may not be necessary when the projections are tightly fitted into the engagement portions to firmly secure the press ring to the retainer.

According to a sixth feature of the present invention, in the structure according to the third feature of the invention, the press ring, the peripheral edge of the inflator receiving opening of the air bag, the sheet and the retainer include apertures at a portion where all of these members are overlapped with one another, and pins extend into these apertures.

In the structure according to the sixth feature of the present invention, the pins extend through the press ring, the peripheral edge of the opening of the air bag, the sheet, and the retainer. These pins resist force which may, otherwise, cause release of the peripheral edge of the inflator receiving opening of the air bag from the press ring and the retainer when the air bag is inflated. The provision of a number of these pins does prevent release of the peripheral edge of the inflator receiving opening of the air bag when the air bag is inflated.

These pins are simply inserted into the apertures of the press ring, the air bag and the retainer. This enables ready assembly of the air bag system.

After the pins have been inserted, a few number of rivets or may be used, if necessary, to secure the press ring to the retainer.

Rivets or screws may not be used when the pins are tightly fitted into the apertures or when split pins are used.

According to a seventh feature of the present invention, in the structure according to the third to sixth features of the invention, the sheet is annular and complementary to the shape of the press ring.

In the structure according to the seventh feature of the invention, the sheet has a shape complementary to the shape of the press ring and can be readily assembled, accordingly.

As previously described, in the structure according to the third to seventh features of the invention, the annular sheet is attached to the air bag to reinforce the air bag and assure mounting of the air bag.

This structure requires a fewer number of rivets or screws used to secure the air bag to the retainer. This results in an increase in the production rate and in a decrease in the cost of rivets and screws. Of course, the air bag can firmly be mounted to the retainer in that it is engaged with the projections, pins or split pins of the annular sheet, the press ring or the retainer.

PREFERRED EMBODIMENTS

The present invention will now be described, by way of example, with reference to the drawings.

Figure 1:
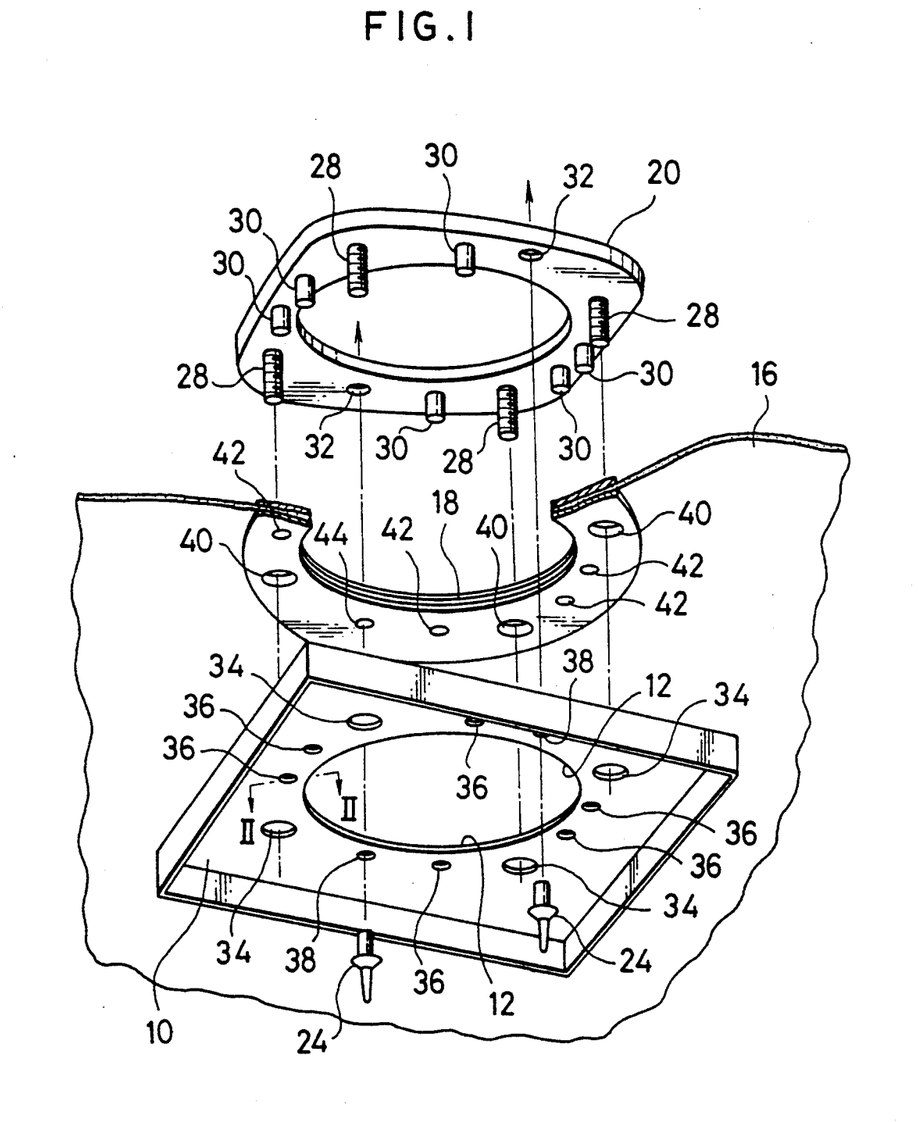
FIG. 1 is a perspective view of a structure according to one embodiment of the present invention.
Figure 2:
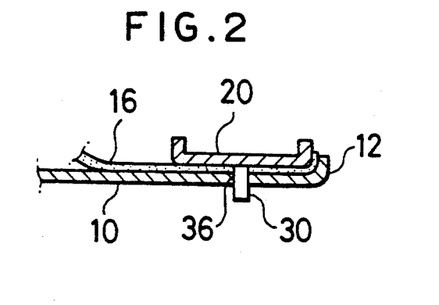
FIG. 2 is a sectional view taken along the line II—II of FIG. 1.

FIG. 1 is a structure for mounting an air bag in an air bag system, according to one embodiment of the present invention. FIG. 2 is a sectional view taken along the line II—II of FIG. 1.

Illustratively, a press ring 20 includes four stud bolts 28 and six projections 30. The press ring 20 also has two rivet apertures 32.

A retainer 10 has an inflator mounting opening 12. Four apertures 34 are formed in the peripheral edge of the opening 12 to receive the stud bolts 28. Also, six apertures 36 and two rivet apertures 38 are formed in the retainer to receive the six projections 30 and the two blind rivets 24, respectively.

An air bag 16 includes an inflator receiving opening 18. Four bolt apertures 40 are formed in the peripheral edge of the opening 18 to receive the stud bolts 28. Also, six apertures 42 and two rivet apertures 44 are formed in the air bag to receive the six projections 30 and the two blind rivets 24, respectively.

The air bag 16 is mounted to the retainer 10 so that the opening 18 is coaxial or aligned with the opening 12. The press ring 20 is thereafter placed on the air bag 16. The stud bolts 28 extend into the bolt apertures 40 and 34, and the projections 30 extend into the apertures 42 and 36. Then, the blind rivets 24 extend into the rivet apertures 38 and 44 to secure the press ring 20 to the retainer 10. This allows the press ring 20 and the retainer 10 to sandwich the air bag 16.

Either before or after the use of the blind rivets, the stud bolts are threaded into nuts to firmly mount an inflator to the retainer. The air bag 16 is then sandwiched between the press ring 20 and the retainer 10.

As is clear from FIGS. 1 and 2, this embodiment uses two blind rivets, namely, one fourth of the prior art structure where eight blind rivets are used. This reduces the number of riveting operations, increases the production rate, and decreases the cost of rivets. The projections 30 extend through the apertures 42 to engage with the engagement portions or openings 36 and resist force which may, otherwise, cause release of the air bag 16 from the press ring 20 and the retainer 10 when the air bag 16 is inflated.

FIGS. 3 to 8 are sectional views similar to FIG. 2, but showing different embodiments of the present invention.

Figure 3:
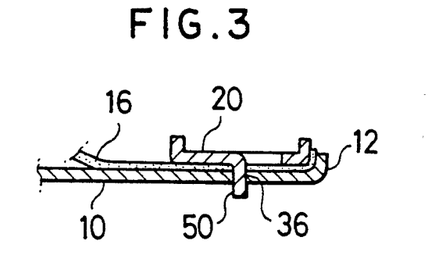
FIGS. 3 to 8 are sectional views similar to FIG. 2, each showing the principal part of a different embodiment.
Figure 4:
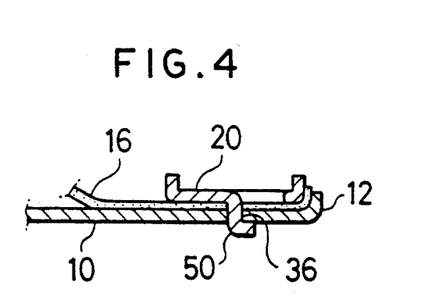
Figure 11:
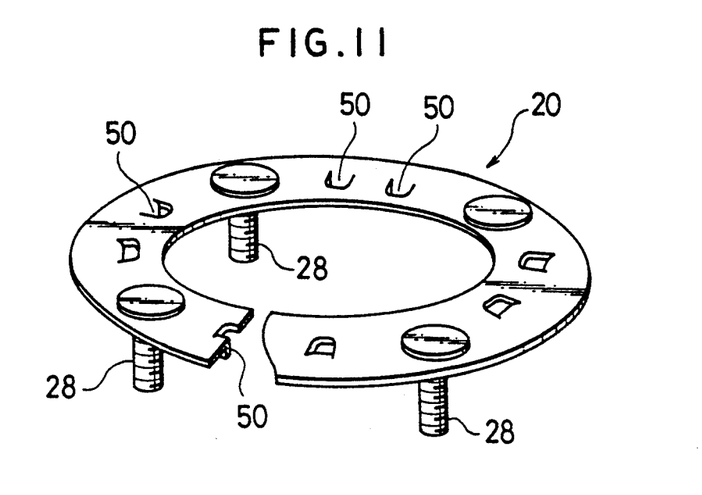
FIG. 11 is a perspective view of a press ring shown in FIG. 3.

Referring to FIG. 3, the press ring 20 has claws or projections 50. The projections 50 extend through the apertures 36 and may have a bent end as shown in FIG. 4. FIG. 11 is a perspective view, partly broken away, of the press ring 20 from which these projections 50 extend.

Figure 5:
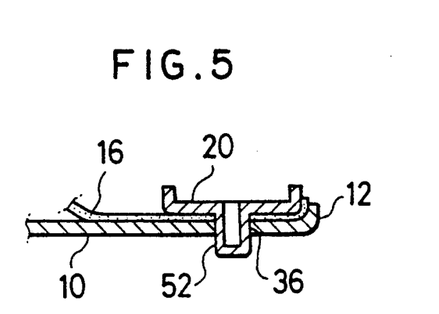
Figure 12:
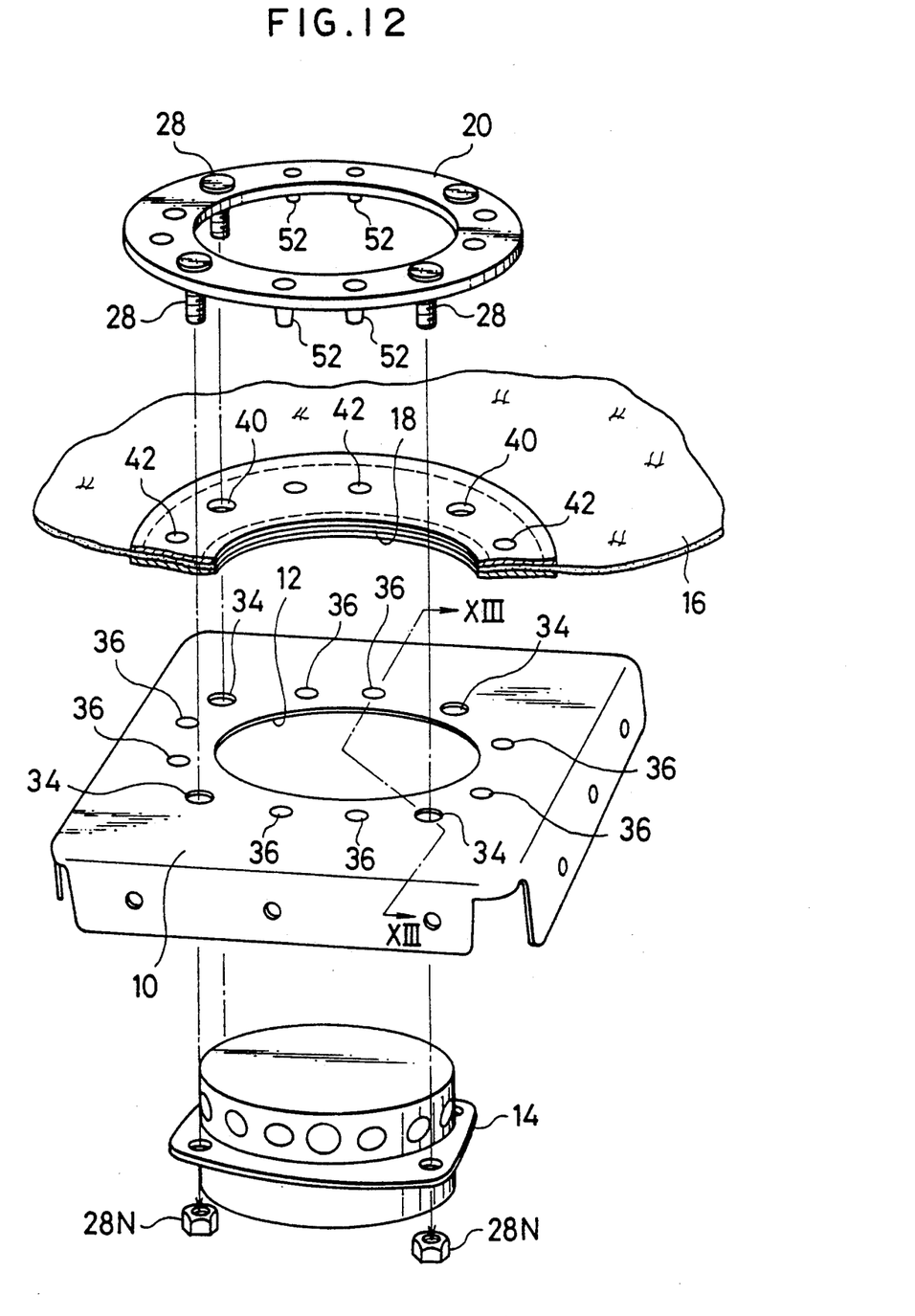
FIG. 12 is a disassembled view of a structure with a press ring shown in FIG. 5.
Figure 13:
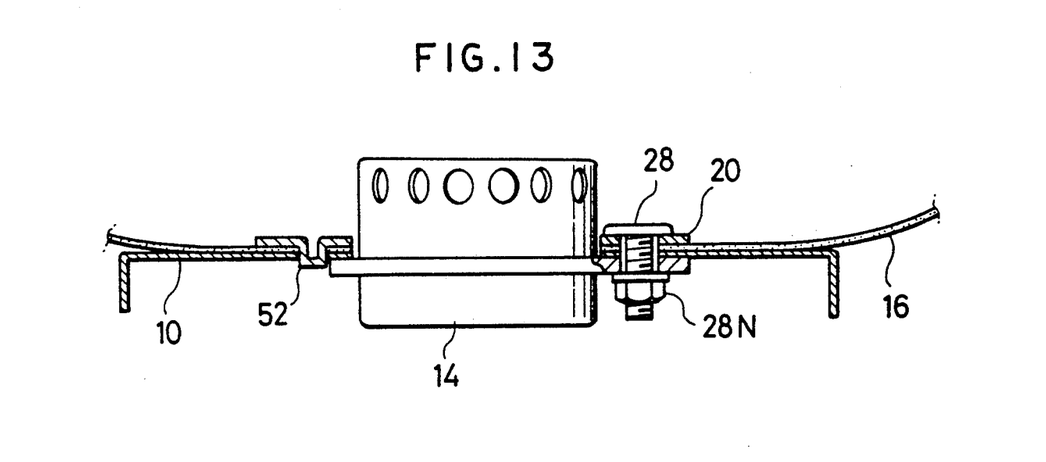
FIG. 13 is a sectional view taken along the line XIII—XIII of FIG. 12.

Referring to FIG. 5, the press ring 20 has bosses or projections 52 formed by a deep drawing process. FIG. 12 is a disassembled view, in perspective, of a structure with the press ring 20 from which the projections 52 extend. As shown, this embodiment eliminates rivets and employs eight projections 52. FIG. 13 is a sectional view taken along the line XIII—XIII of FIG. 12 showing the manner in which the press ring 20 is secured to the retainer 10 by the stud bolts 28 and the nuts 28N.

Figure 6:
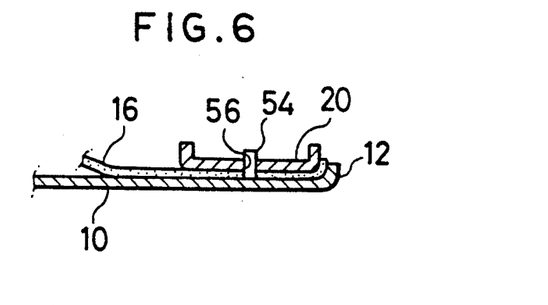

Referring to FIG. 6, the retainer 10 includes pins or projections 54. The projections 54 are similar to the projections 30 and extend through apertures 56 which are, in turn, formed in the press ring 20.

Figure 7:
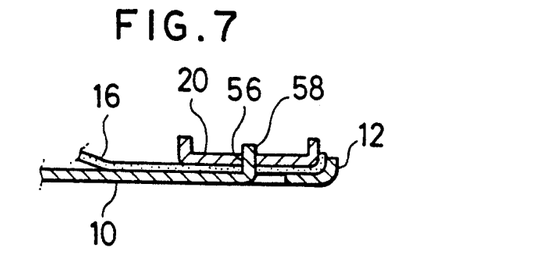

Referring to FIG. 7, the retainer 10 includes claws or bent projections 58. Although not shown, the claws 58 extend through the press ring 20 and may have a bent end as in the embodiment shown in FIG. 4.

Figure 8:
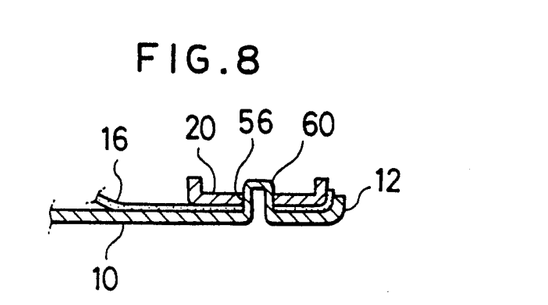

Referring to FIG. 8, the retainer 10 has projections 60 formed by a deep drawing process.

Like reference numerals designate like parts throughout FIGS. 2 to 8. The embodiments shown in FIGS. 3 to 8 are operated in the same manner and provide the same advantages as the embodiment shown in FIG. 2. In the foregoing embodiments, blind rivets are used to secure the press ring 20 to the retainer 10. Alternatively, screws or a combination of rivets and screws may be used.

In the foregoing embodiments, the projections extend from the press ring 20 or the retainer 10. As an alternative, the press ring 20 and the retainer 10 include projections and corresponding engagement portions to receive the projections.

In the foregoing embodiments, the apertures 36 serve as engagement portions. Alternatively, recesses may be formed in the retainer 10 by a deep drawing process.

Figure 14:
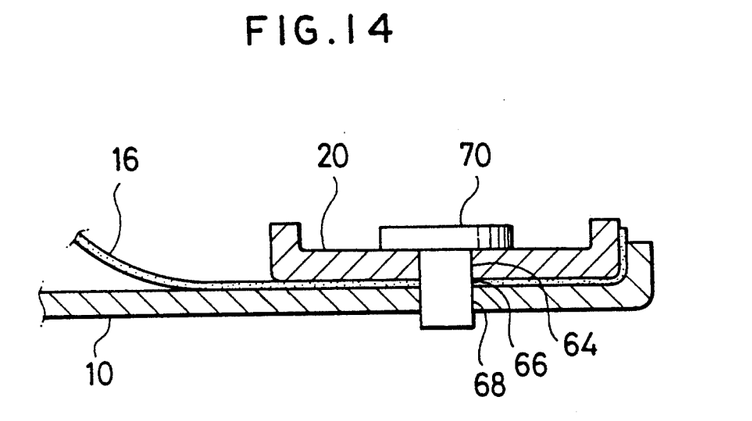
FIGS. 14 and 15 are sectional views showing the principal parts of different embodiments.
Figure 15:
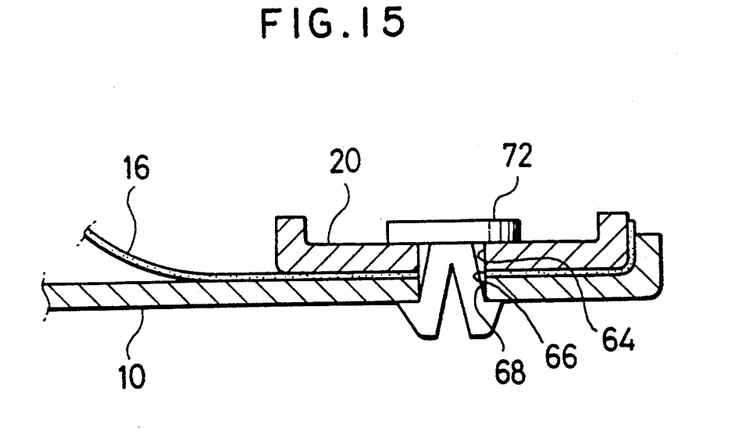

FIGS. 14 and 15 illustrate different embodiments of the present invention. In FIG. 14, the press ring 20, the air bag 16 and the retainer 10 include apertures 64, 66 and 68, respectively to receive pins 70. As shown in FIG. 15, split pins 72 may be used in lieu of the pins 70.

These embodiments, as shown in FIGS. 14 and 15, can also reduce the number of rivets or screws required to secure the press ring 20 to the retainer 10. The pins 70 tightly fit in the apertures or the split pins 72 may eliminate rivets or screws.

Figure 16:
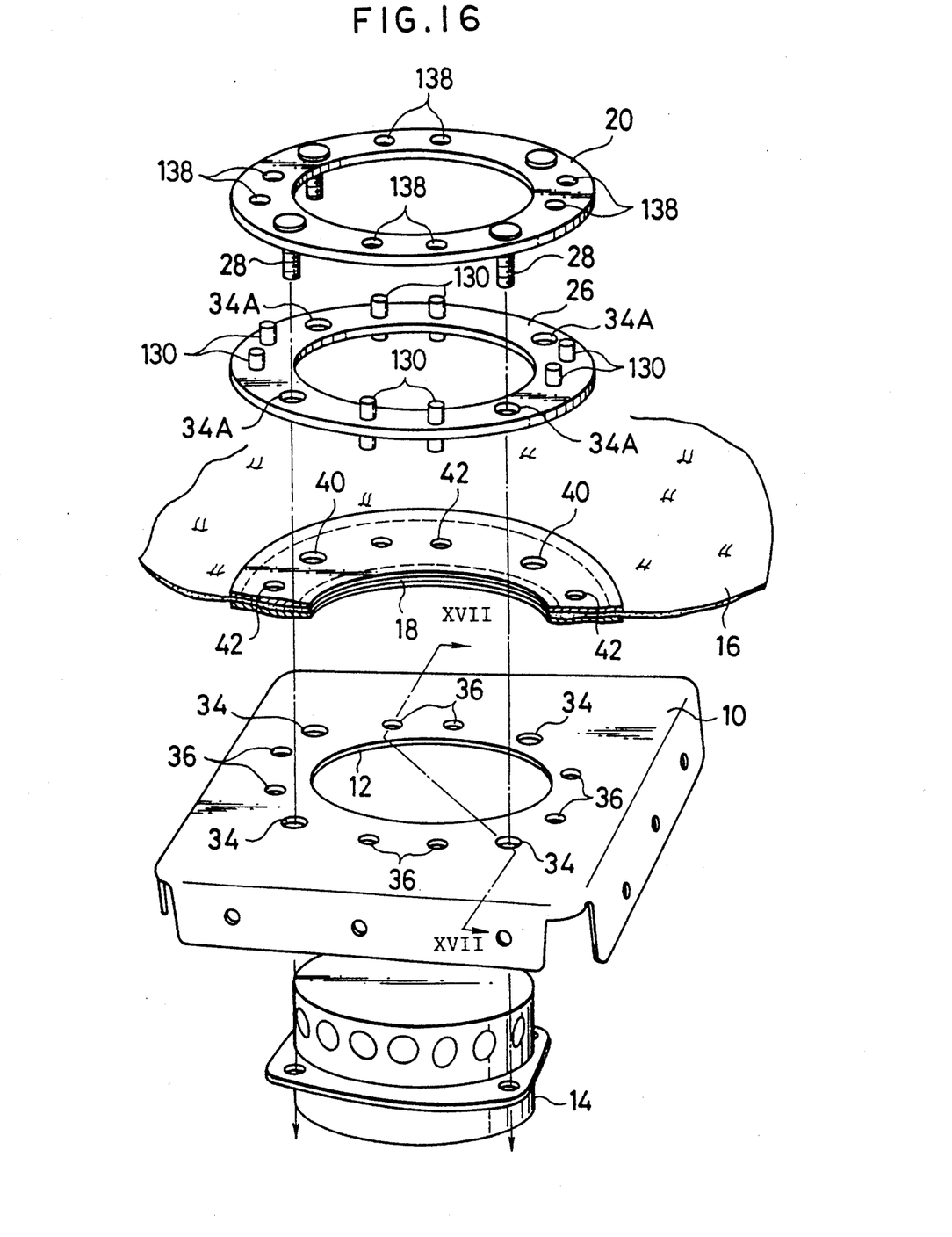
FIG. 16 is a perspective view showing a structure according to a third feature of the present invention.
Figure 17:
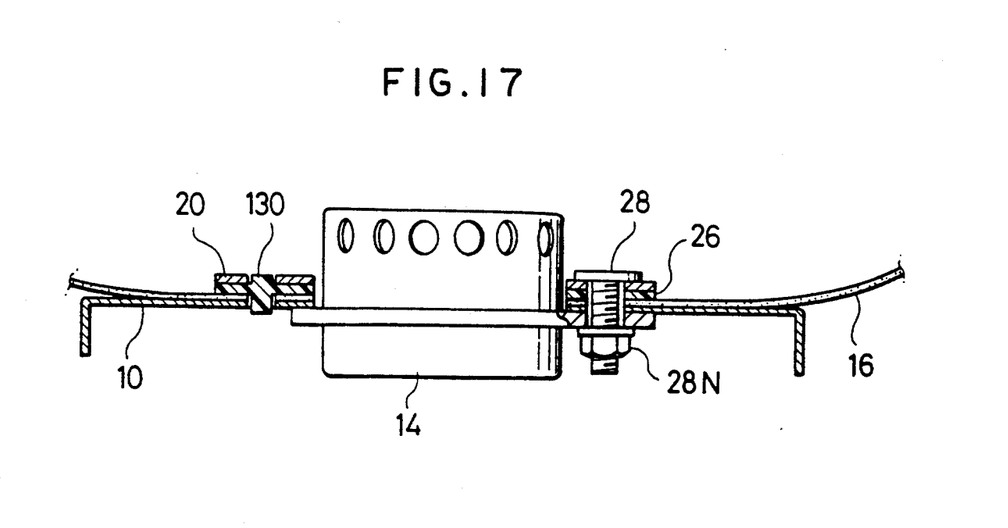
FIG. 17 is a sectional view taken along the line XVII—XVII of FIG. 16.

FIG. 16 is a disassembled view, in perspective, of a modified structure for mounting an air bag. FIG. 17 is a sectional view taken along the line XVII—XVII of FIG. 16.

In the embodiment shown in FIGS. 16 and 17, a thin annular sheet 26 is made of synthetic resin and attached to the peripheral edge of the opening 18 of the air bag 16 by stitching or by an adhesive. Eight pins 130 extend through the annular sheet 26. Illustratively, the press ring 20 has four stud bolts 28 and eight apertures 138.

The annular sheet 26, the air bag 16 and the retainer 10 include four bolt apertures 34A, 40 and 34 respectively, to receive the stud bolts 28. The air bag 16 has eight apertures 42 to receive the projections 130. The retainer 10 and the press ring 20 include eight apertures 36 and 138, respectively, to receive the eight projections 130.

The air bag 16 with the annular sheet 26 is mounted to the retainer 10 such that the opening 18 is aligned with the opening 12. The press ring 20 is thereafter placed on the air bag 16. The stud bolts 28 extend into the bolt apertures 34A, 40 and 34, and the projections 130 extend into the apertures 42, 36 and 138. The stud bolts 28 are then threaded into nuts 28N to firmly secure the inflator 14 to the retainer 10. The press ring 20 and the retainer 10 cooperate to sandwich the air bag 16.

In such a structure, the annular sheet 26 is attached to the air bag 16 to reinforce the peripheral edge of the opening 18 of the air bag 16. Additionally, force is exerted on the peripheral edge of the inflator receiving opening of the air bag, but is dispersed over the peripheral edge of the inflator receiving opening of the air bag 16. This prevents release or damage of the air bag 16.

As is clear from FIGS. 16 and 17, the illustrated embodiment employs no blind rivet 24. This reduces the number of riveting operations, increases the production rate, and decreases the cost of rivets. The projections 130 extend through the apertures 42 to engage with the engagement portions or openings 36 and 138. As previously stated, these projections 130 resist force which may, otherwise, cause release of the air bag 16 from the retainer 10 and the press ring 20 when the air bag 16 is inflated.

Figure 18:
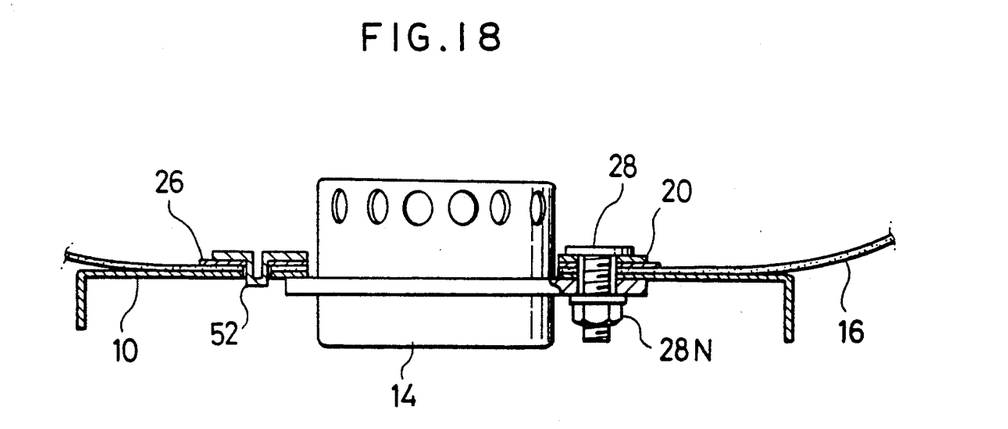
FIG. 18 is a sectional view taken along the line XVIII—XVIII of FIG. 19.
Figure 19:
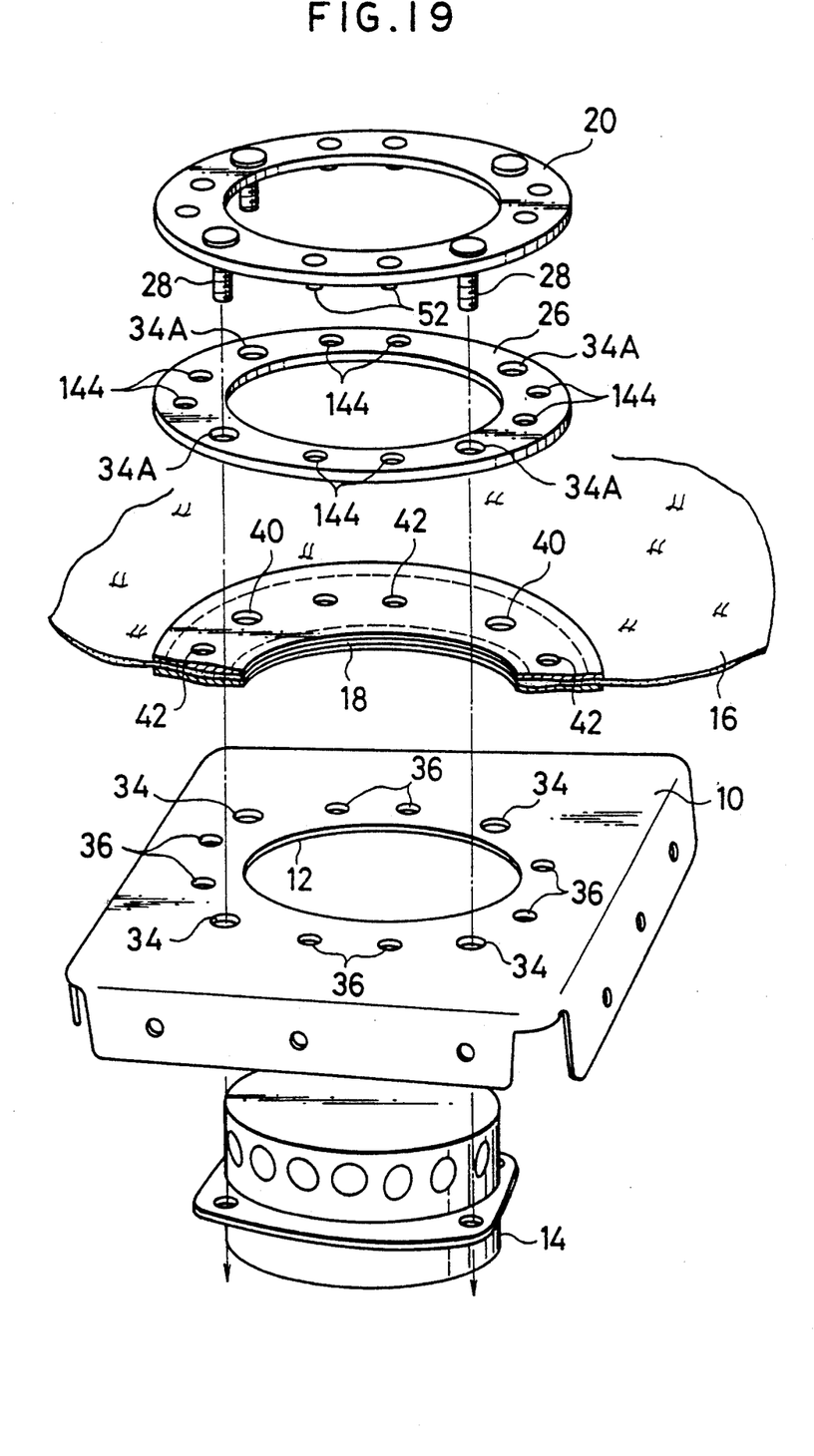
FIG. 19 is a perspective view of a structure with a press ring shown in FIG. 18.
Figure 22:
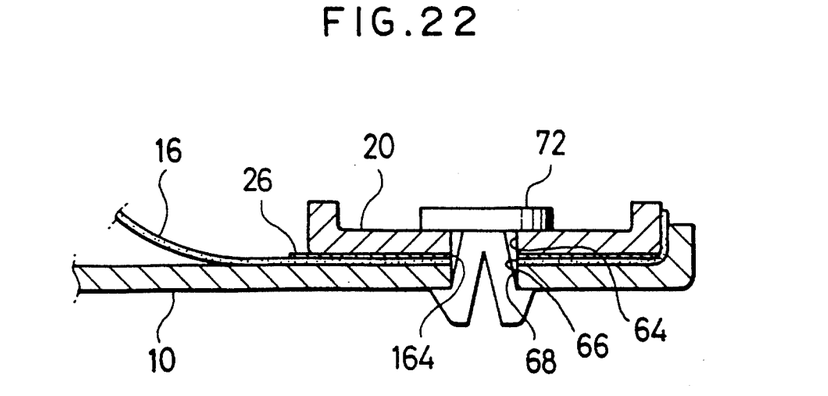

FIGS. 18 and 22 illustrate further embodiments of the present invention.

Referring to FIGS. 18 and to 19, the press ring 20 has bosses or projections 52 formed by a deep drawing process. The projections 52 extend through the apertures 144 of the annular sheet 26 and the apertures 42 of the air bag 16 into the apertures 36 of the retainer 10. FIG. 18 is a sectional view showing the principal part of the press ring 20 from which these projections 52 extend. This embodiment also eliminates rivets and instead, includes eight projections 52. The remaining structure is similar to that shown in FIGS. 1 and 2.

Figure 20:
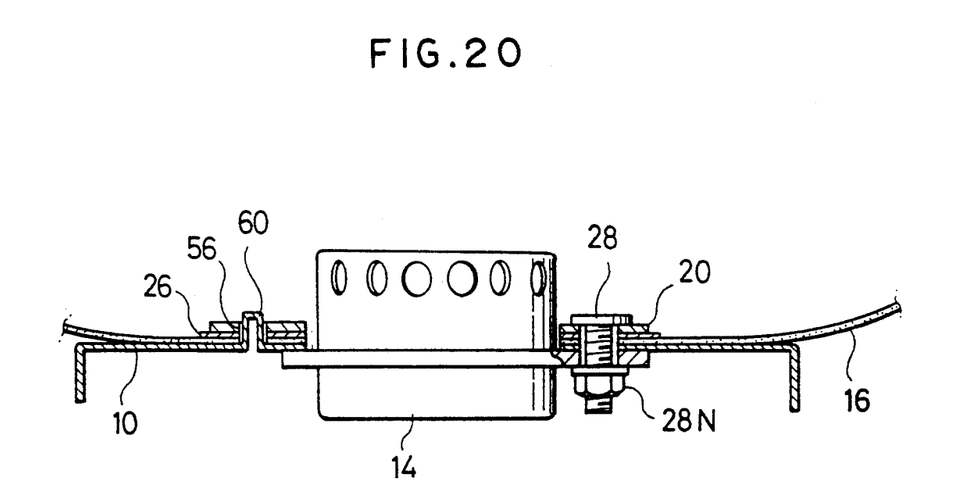
FIGS. 20 to 22 are sectional views showing the principal parts of different embodiments.

Referring to FIG. 20, the retainer 10 has projections 60. These projections 60 are similar to the projections 52 and extend into the engagement portions or openings 56 which are, in turn, formed in the press ring 20.

Figure 21:
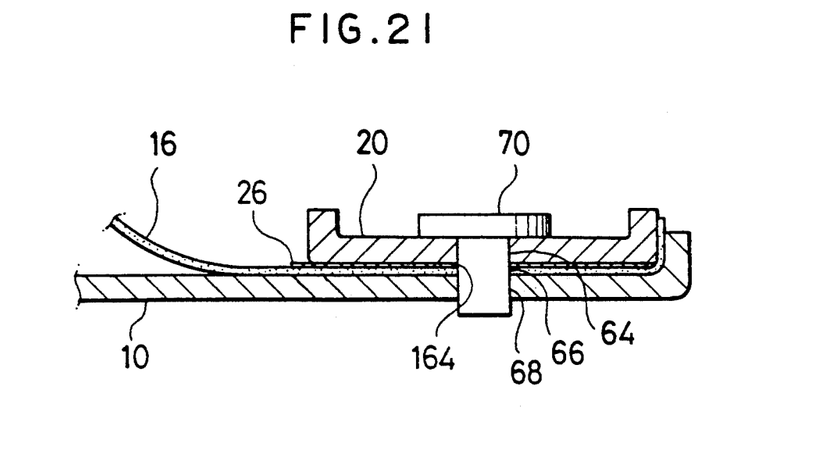

The embodiments shown in FIGS. 20 to 22 may use the press ring 20 shown in FIGS. 6-8.

Like reference numerals designate like parts throughout FIGS. 16 and 17 and FIGS. 18 to 22. The embodiments shown in FIGS. 18 to 22 are operated in the same manner and provide the same advantages as the embodiment shown in FIGS. 16 and 17. In the foregoing embodiments, fastening of the press ring 20 to the retainer 10 requires no blind rivet, but may require a combination of a few rivets or screws.

Also, in the foregoing embodiments, the projections extend either from the press ring 20 or from the retainer 10. Alternatively, the projections may extend both from the press ring 20 and the retainer 10 and engage with corresponding engagement portions in the retainer 10 and the press ring 20, respectively.

In the foregoing embodiments, the apertures 36 and 138 are formed as engagement portions. As an alternative, recesses may be formed by a deep drawing process.

FIGS. 21 and 22 are sectional views each showing the principal part of another embodiment of the present invention. Referring to FIG. 21, the press ring 20, the annular sheet 26, the air bag 16 and the retainer 10 include pin apertures 64, 164, 66 and 68 to receive pins 70. Referring to FIG. 22, split pins 72 are used in liue of the pins 70.

In the embodiments shown in FIGS. 21 and 22, a reduced number of rivets or screws may be used to secure the press ring 20 to the retainer 10. No rivet or screw is required provided that the pins are tightly fitted into the apertures or when the split rivets 72 are used.

We claim:

1. A structure for mounting an air bag in an air bag system comprising:

a retainer having an inflator mounting opening, and a plurality of first and second openings around the inflator mounting opening, an air bag having an inflator receiving opening aligned with the inflator mounting opening, a peripheral edge around the inflator receiving opening, and a plurality of third and fourth openings at the peripheral edge, said third and fourth openings corresponding to the first and second openings, respectively, a press ring situated above the peripheral edge of the air bag to hold the peripheral edge of the air bag relative to the retainer, said press ring having a plurality of fifth openings, an annular sheet made of synthetic resin and situated between the press ring and the peripheral edge of the air bag, said sheet having a plurality of first projections extending upwardly from the sheet and a plurality of second projections extending downwardly from the sheet so that when the air bag is assembled, the first projections engage the fifth openings of the press ring without projecting outwardly beyond an upper surface of the press ring, and the second projections extend through the third openings of the air bag and engage the first openings of the retainer to immovably hold the peripheral edge of the air bag relative to the retainer and the press ring by the first and second projections, said annular sheet having a plurality of sixth openings corresponding to the second and fourth openings, and means for securing the press ring to the retainer, said securing means passing through the second, fourth and sixth openings to thereby securely fix the press ring and the peripheral edge of the air bag to the retainer.

2. The structure of claim 1, wherein said second projection has length greater than that of the first projection, said first and second projections vertically aligning together.

3. The structure of claim 2, wherein said securing means are stud bolts fixed to the press ring.

4. The structure of claim 2, wherein said sheet is complementary to the shape of said press ring.

* * * * *